United States Patent [19]

Akiyama

[11] Patent Number: 5,715,113
[45] Date of Patent: Feb. 3, 1998

[54] LIBRARY APPARATUS INCLUDING CARTRIDGE ACCESS STATION

[75] Inventor: Yoshiki Akiyama, Kawasaki, Japan

[73] Assignee: Fujitsu Limited, Kawasaki, Japan

[21] Appl. No.: 770,993

[22] Filed: Dec. 23, 1996

Related U.S. Application Data

[63] Continuation of Ser. No. 510,760, Aug. 3, 1995, abandoned, which is a continuation of Ser. No. 259,019, Jun. 13, 1994, abandoned.

[30] Foreign Application Priority Data

Sep. 20, 1993 [JP] Japan .................................. 5-233060

[51] Int. Cl.$^6$ ............................................. G11B 15/68
[52] U.S. Cl. ........................................................... 360/92
[58] Field of Search ................................ 360/69, 71, 92, 360/98.01, 98.04, 98.06; 414/280, 276; 369/34, 36, 38, 178, 191

[56] References Cited

U.S. PATENT DOCUMENTS

| | | | |
|---|---|---|---|
| 4,787,074 | 11/1988 | Deck et al. | 369/36 |
| 5,371,640 | 12/1994 | Kvifte et al. | 360/92 |

FOREIGN PATENT DOCUMENTS

| | | | |
|---|---|---|---|
| 1251463 | 10/1989 | Japan | 360/92 |
| 2-81353 | 3/1990 | Japan | 360/92 |
| 2254667 | 10/1990 | Japan | 360/92 |
| 3269860 | 12/1991 | Japan | 360/92 |
| 3280248 | 12/1991 | Japan | 360/92 |
| 3283133 | 12/1991 | Japan | 360/92 |
| 4-40663 | 2/1992 | Japan | 360/92 |
| 4146561 | 5/1992 | Japan | . |

*Primary Examiner*—Stuart S. Levy
*Assistant Examiner*—William J. Klimowicz
*Attorney, Agent, or Firm*—Greer, Burns & Crain, Ltd.

[57] ABSTRACT

A library apparatus for preventing a recording medium cartridge from floating during a transferring operation of the cartridge. The library apparatus comprises a cell unit having a plurality of cells each for receiving a recording medium cartridge, a drive unit for recording/reproducing information on the recording medium cartridge, a cartridge access station for supplying/discharging the recording medium cartridge, and an accesser for moving the recording medium cartridge from one to the other among the cell unit, the drive unit and the cartridge access station. The cartridge access station includes an entry mechanism for separating, one by one, the recording medium cartridges supplied to a first position and transferring such separated cartridge to a second position for delivering the cartridge to the accesser.

4 Claims, 17 Drawing Sheets

LIBRARY APPARATUS INCLUDING CARTRIDGE ACCESS STATION

RELATED APPLICATION

This application is a continuation of application Ser. No. 08/510,760 filed on Aug. 3, 1995, now abandoned, which is a continuation of Ser. No. 08/259,019 filed on Jun. 13, 1994, now abandoned.

BACKGROUND OF THE INVENTION

1. Field of the Invention

This invention relates generally to a library apparatus for a recording medium cartridge such as a magnetic tape cartridge (hereinafter sometimes simply referred to as "cartridge"), and more particularly to a library apparatus including a cartridge access station for supplying/discharging the cartridge.

2. Description of the Related Art

Recently, in the information processing field, a library apparatus for a recording medium cartridge is used with the progressing tendency that mass backup data are required to be stored. A library apparatus of this type is designed such that the operator can set cartridges therein from outside and take out cartridges already set therein from outside. Therefore, it is demanded that the cartridge can be positively supplied to and discharged from the library apparatus.

Heretofore, there is known a library apparatus comprising a cell unit including a plurality of cells each for receiving a cartridge, a drive unit for recording/reproducing information on the cartridge, a cartridge access station for supplying/discharging the cartridge, and an accesser for moving the cartridge from one to the other among the cell unit, the drive unit and the cartridge access station. The cartridge access station includes an entry mechanism which participates in the supplying operation of the cartridge. This entry mechanism separates, one by one, the cartridges supplied to a first position so as to be transferred to a second position for delivering such separated cartridge to the accesser.

One of the commercially available conventional entry mechanisms comprises first and second feeders capable of contacting opposite side surfaces of the recording medium cartridge so as to transfer the recording medium cartridge, feeder opening/closing means for opening/closing the first and second feeders so that the recording medium cartridge is sandwiched between the first and second feeders, and control means for controlling the feeder opening/closing means such that the first and second feeders are closed when the recording medium cartridge is supplied to the first position and the first and second feeders are opened when the recording medium cartridge is transferred to the second position so as to be ready for the accesser to receive the cartridge.

According to the control operation made by the control means in the entry mechanism provided in the conventional library apparatus, the cartridge is sometimes floated, slightly though, while the cartridge is being transferred from the first position to the second position due to irregularity of dimensional accuracy, etc., in the first and second feeders and in the opening/closing means. This creates various problems which will be described in detail.

SUMMARY OF THE INVENTION

It is, therefore, an object of the present invention to provide a library apparatus, in which adverse effects caused by floating of a cartridge occurable while the cartridge is being transferred, can be eliminated.

In accordance with an aspect of the present invention, there is provided a library apparatus comprising: a cell unit having a plurality of cells each for receiving a recording medium cartridge; a drive unit for recording/reproducing information on the recording medium cartridge; a cartridge access station for supplying/discharging the recording medium cartridge, the cartridge access station including an entry mechanism for separating, one by one, a plurality of recording medium cartridges supplied to a first position and transferring each of such separated cartridges to a second position; and an accesser for moving the recording medium cartridge from one to the other among the cell unit, the drive unit and the cartridge access station; the entry mechanism comprising first and second feeders capable of contacting opposite side surfaces of the recording medium cartridge so as to transfer the recording medium cartridge; feeder opening/closing means for opening/closing the first and second feeders so that the recording medium cartridge is sandwiched between the first and second feeders; and control means for controlling the feeder opening/closing means such that the first and second feeders are closed when the recording medium cartridge is supplied to the first position and the first and second feeders are opened when the recording medium cartridge is transferred to the second position so as to be readily received by the accesser, the shutter control means being adapted to open, for a short time period, the first and second feeders and to close the first and second feeders again before the recording medium cartridge is transferred to the second position so as to be ready for the accesser to receive the cartridge.

In the library apparatus according to the present invention, since the control means controls the feeder opening/closing means to open, for a short time period, the first and second feeders and close the first and second feeders again before the recording medium cartridge is transferred to the second position so as to be ready for the accesser to receive the cartridge, a floating of the cartridge occurrable while the cartridge is being transferred, can be corrected.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Figure 1:
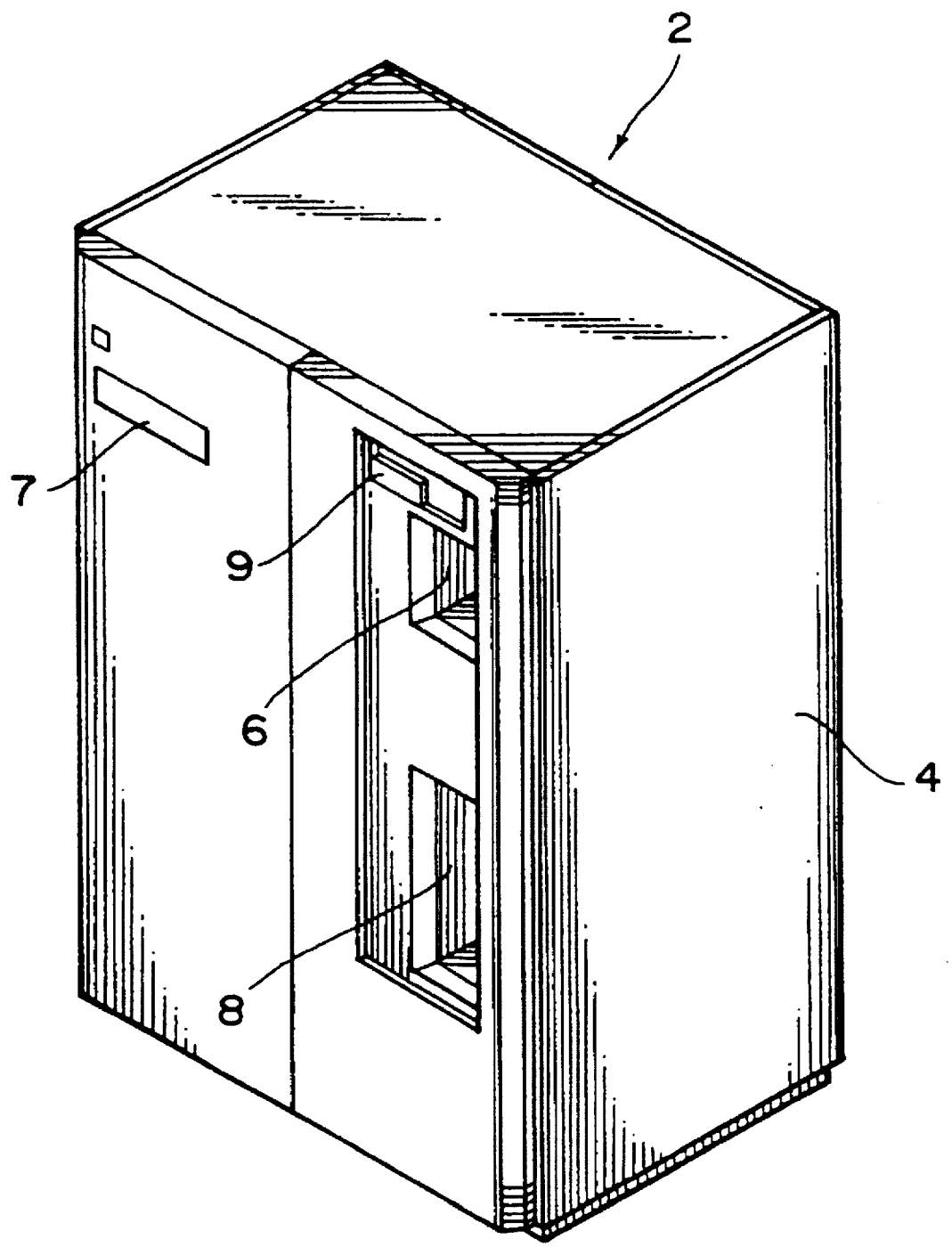
FIG. 1 is a perspective view of a front side of a library apparatus according to one embodiment of the present invention.
Figure 2:
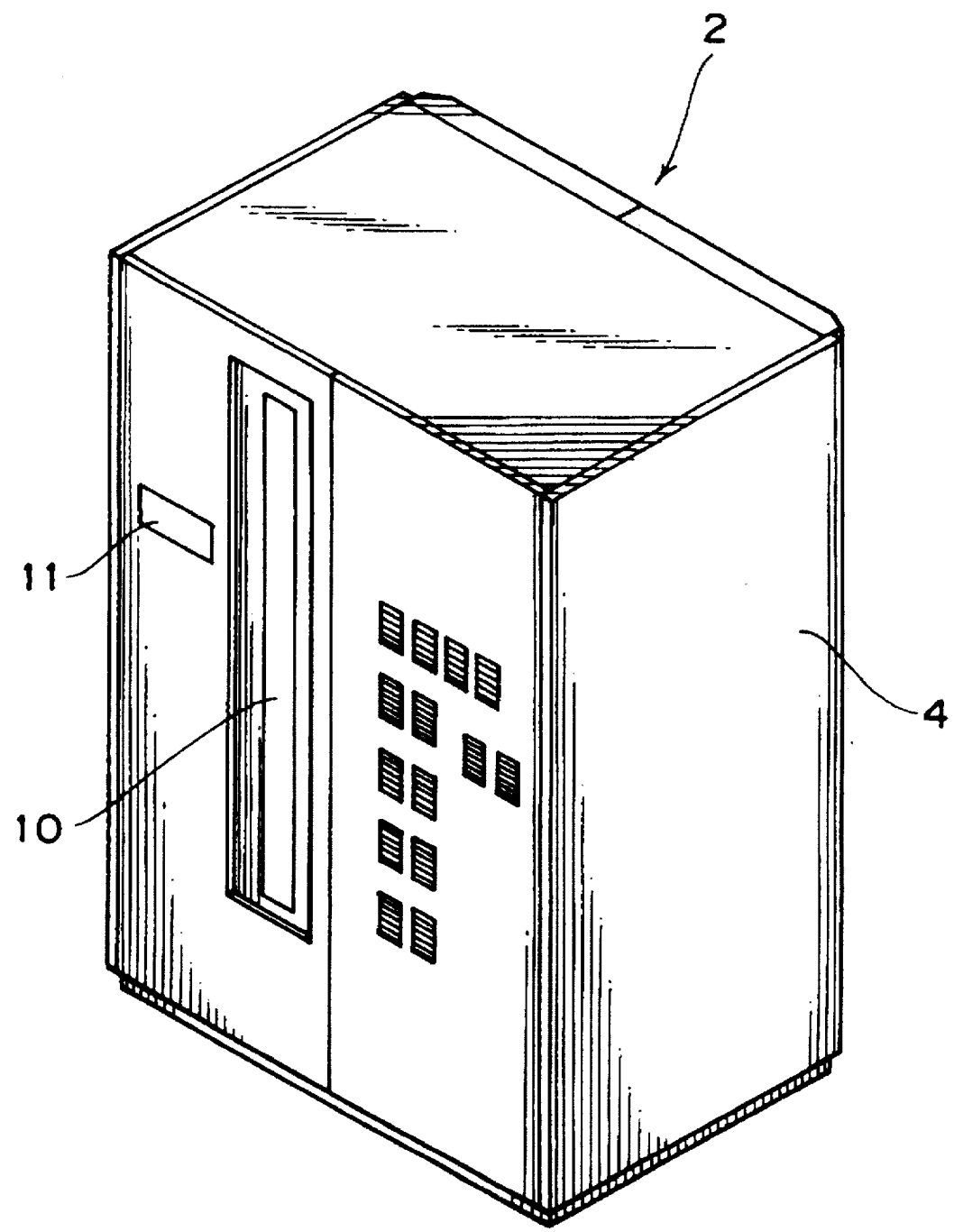
FIG. 2 is a perspective view of a rear side of the library apparatus of FIG. 1.

Referring first to FIGS. 1 and 2, there are illustrated a perspective view of an outer appearance of a front side of a library apparatus and a perspective view of an outer appearance of a rear side of the library apparatus. A front surface of a housing 4 of the library apparatus 2 is provided with a cartridge inlet port or entry port 6, a cartridge outlet port or discharge port 8, and operating panels 7 and 9. Ten cartridges, for example, can be supplied into the cartridge inlet port 6 at a time, and fifteen cartridges, for example, are stacked in the cartridge outlet port 8 at a time. A rear surface of the housing 4 is provided with a cartridge mass entry/discharge mechanism 10 through which a mass of cartridges are received, at a time, in one row of cells of a cell drum as later described. Reference numeral 11 denotes an operating panel for the cartridge mass entry/discharge mechanism 10.

Figure 3:
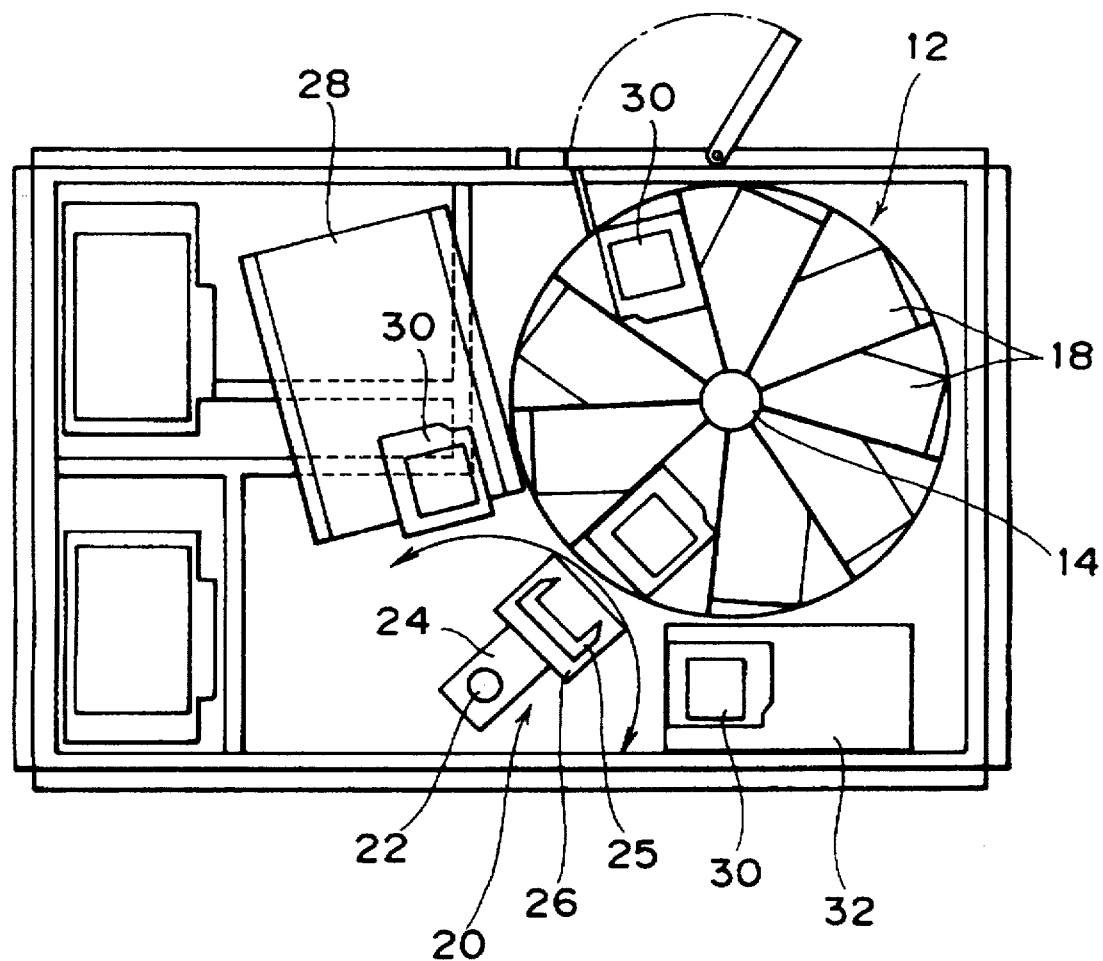
FIG. 3 is a schematic plan view of the library apparatus of FIG. 1, but with a top plate of a housing removed therefrom.
Figure 4:
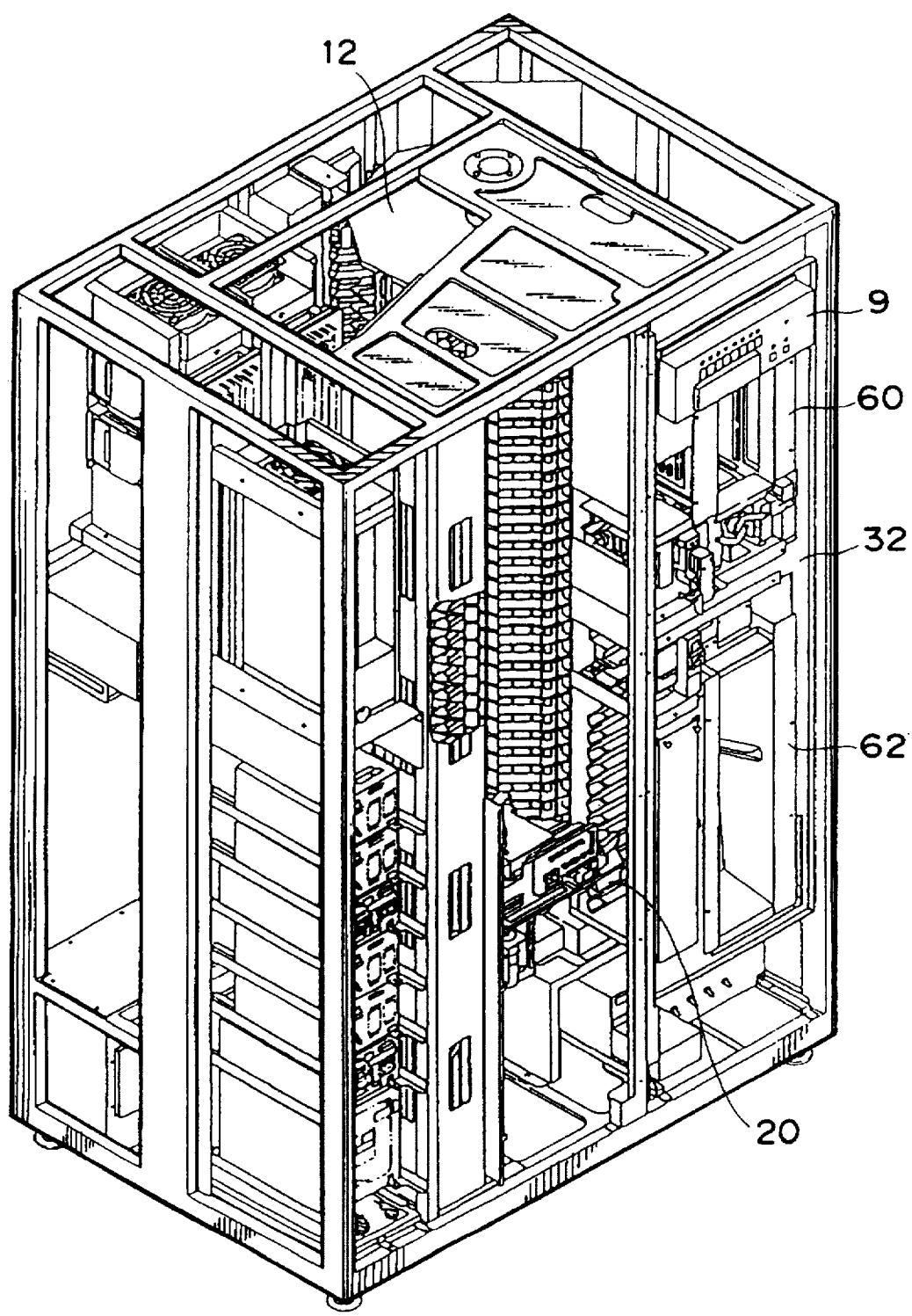
FIG. 4 is a perspective view showing the details of the inside of the library apparatus of FIG. 1.
Figure 5:
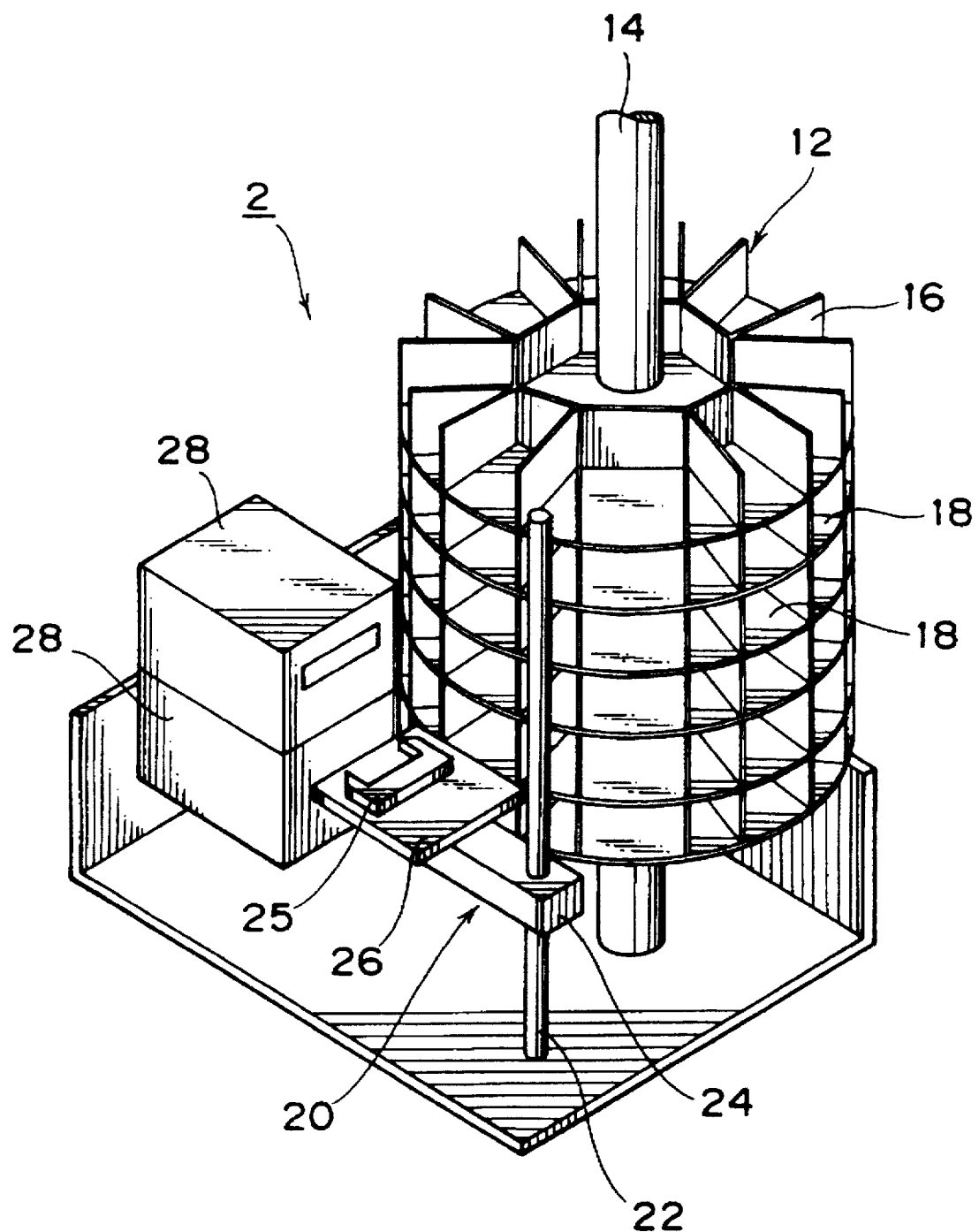
FIG. 5 is a schematic perspective view of primary portions of the inside of the library apparatus of FIG. 1.

FIG. 3 is a schematic plan view of the library apparatus but with a top plate of the housing 4 removed therefrom, FIG. 4 is a perspective view showing the details of the inside of the library apparatus, and FIG. 5 is a schematic perspective view of primary portions of the inside of the library apparatus. Reference numeral 12 denotes a cell drum (cell unit) rotatably mounted on a shaft 14 for rotation about the shaft. The cell drum 12 has a plurality of cells defined by partition walls 16. A plurality of drive units 28 (two units in FIG. 5) for recording/reproducing information with respect to a magnetic tape is disposed adjacent to the cell drum 12. Between the cell drum 12 and the drive units 28 is disposed an accesser 20 for automatically exchanging a cartridge 30 which is to be loaded on the drive units 28.

Figure 6:
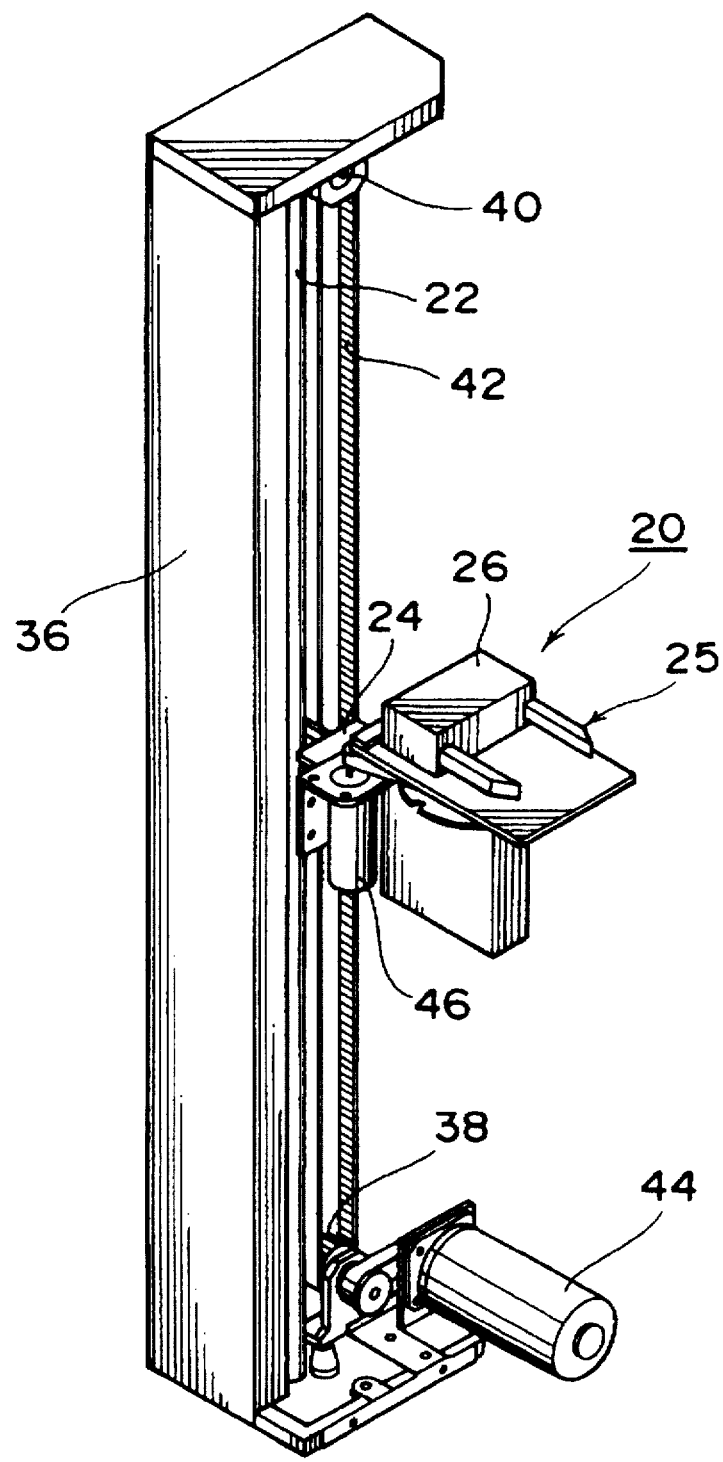
FIG. 6 is a schematic perspective view of an accesser drive mechanism.

A drive mechanism for the accesser 20 is constructed as shown, for example, in FIG. 6. A drive pulley 38 and a driven pulley 40 are rotatably mounted on a generally C-shaped support member 36. An endless timing belt 42 is disposed between the drive pulley 38 and the driven pulley 40. A guide member 22 is secured to the support member 36 in such a manner as to extend in a vertical direction. A support member 24 is secured to the timing belt 42. One end of the support member 24 is in engagement with the guide member 22. A hand mechanism 26 having a pair of grip fingers 25 is placed on the support member 24.

When the motor 44 is driven, the support member 24 secured to the timing belt 42 is moved in a vertical direction guided by the guide member 22. As a result, the hand mechanism 26 placed on the support member 24 is also moved in the vertical direction. Also, when the motor 46 is driven, the support member 24 is pivoted about the guide member 22 in a horizontal plane and the hand mechanism 26 is also pivoted in a horizontal plane. In this way, by controllably driving the motors 44 and 46, the hand mechanism 26 can be accessed to a selected cell 18 in the cell drum 12 and to the drive units 28.

Figure 7:
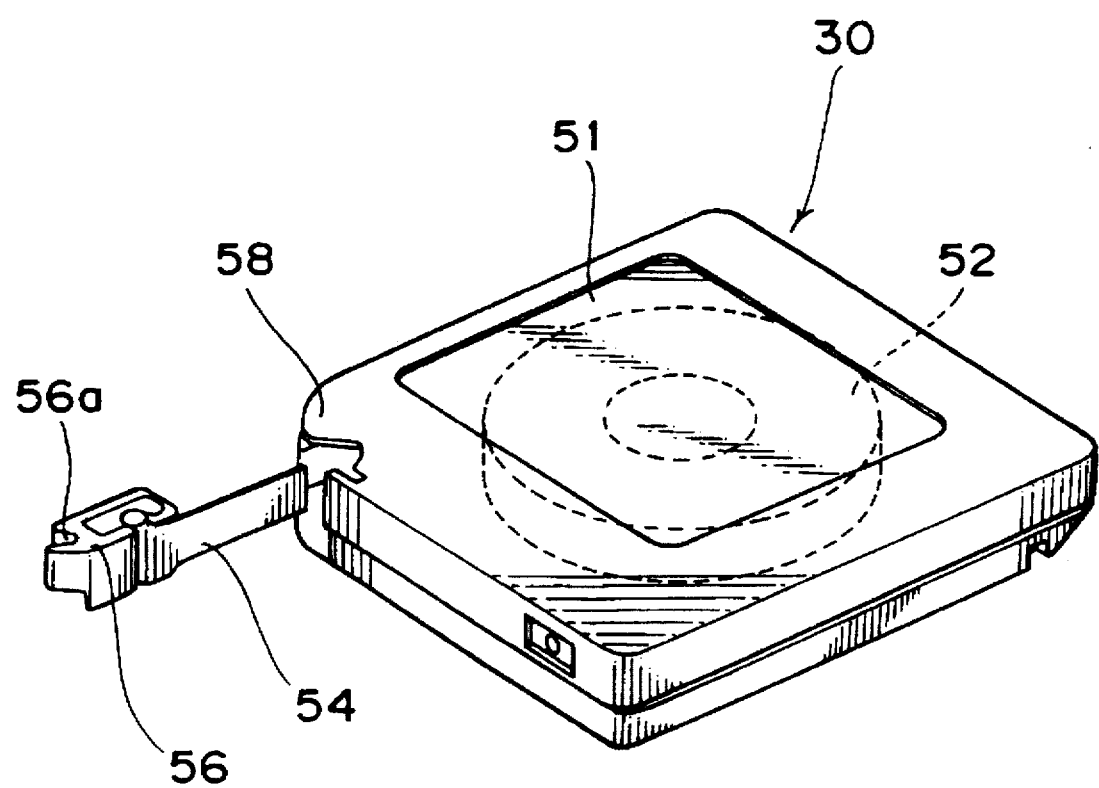
FIG. 7 is a perspective view of a cartridge.

FIG. 7 is a perspective view of a cartridge. Within a generally rectangular parallelepiped cartridge case 51, a tape reel 52 is rotatably disposed. A basal end portion of a magnetic tape 54 is secured to the tape reel 52 (shown hidden), and an intermediate portion of the magnetic tape 54 is taken up on the tape reel 52. A leader block 56 is secured to a distal end of the magnetic tape 54. An engagement groove 56a for allowing sled pins of the drive units 28 to engage, is formed in the leader block 56. A notch 58 is formed in one corner of the cartridge case 51. When the magnetic tape 54 is taken up, the leader block 56 is seated in the notch 58.

Referring again to FIG. 4, a cartridge access station 32 for supplying/discharging the cartridge 30 is disposed on the front surface side of the library apparatus. The cartridge access station 32 includes an entry mechanism 60 for supplying the cartridge 30, and an exit mechanism 62 for discharging the cartridge 30. The entry mechanism 60 and the exit mechanism 62 correspond respectively to the cartridge inlet port 6 and the cartridge outlet port 8 of FIG. 1.

As clearly shown in FIG. 3, the drive units 28, the cell drum 12 and the cartridge access station 32 are spatially arranged so that the cartridge can be transferred from one to the other among the drive units 28, the cell drum 12 and the cartridge access station 32 only by a vertical movement and a swing motion of the accesser 20. The entry mechanism 60 is adapted to transfer the cartridge, which has already been set, to a receiving position of the accesser 20. The entry mechanism 60 includes various detection portions and various mechanism portions as will be described hereinafter. The functions of the respective portions will be described.

Figure 8:
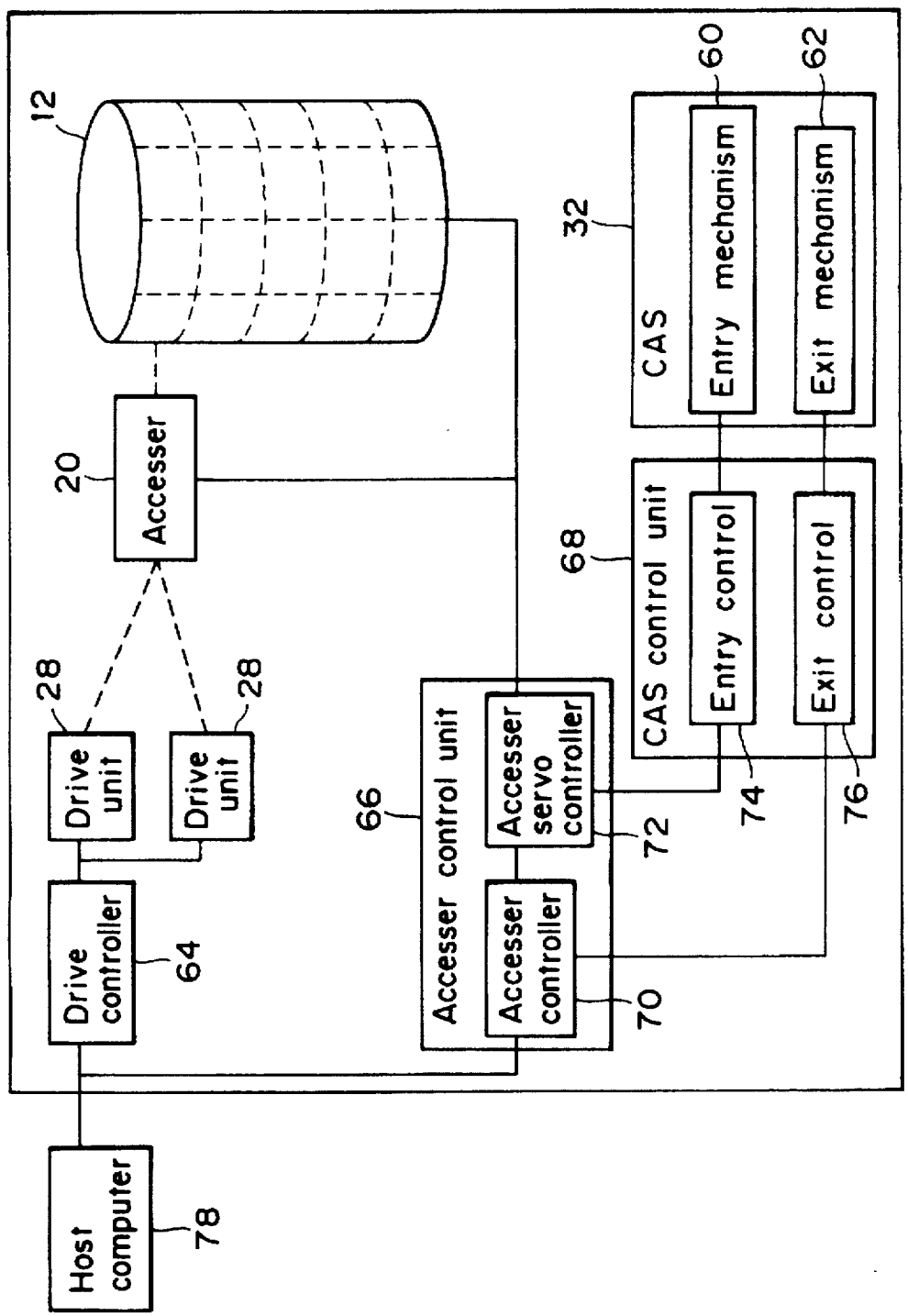
FIG. 8 is a block diagram of a control system of the library apparatus.

FIG. 8 is a block diagram of a control system of the library apparatus. The library apparatus comprises a plurality of drive units 28, a drive controller 64, an accesser 20, a cell drum 12, an accesser control unit 66, a cartridge access station control unit (CAS control unit) 68, and a cartridge access station (CAS) 32. The accesser control unit 66 includes an accesser controller 70, and an accesser servo controller 72. The CAS control unit 68 includes an entry control unit 74 and an exit control unit 76. The entry control unit 74 and the exit control unit 76 are operated to control the entry mechanism 60 and the exit mechanism 62 of the CAS 32, respectively.

The drive controller 64 and the accesser control unit 66 are connected to a host computer 78. The drive controller 64 is operated to control the drive units 28. The accesser control unit 66, the accesser 20 and the cell drum 12 are connected to one another. The accesser control unit 66 is also connected to the CAS control unit 68.

Figure 9:
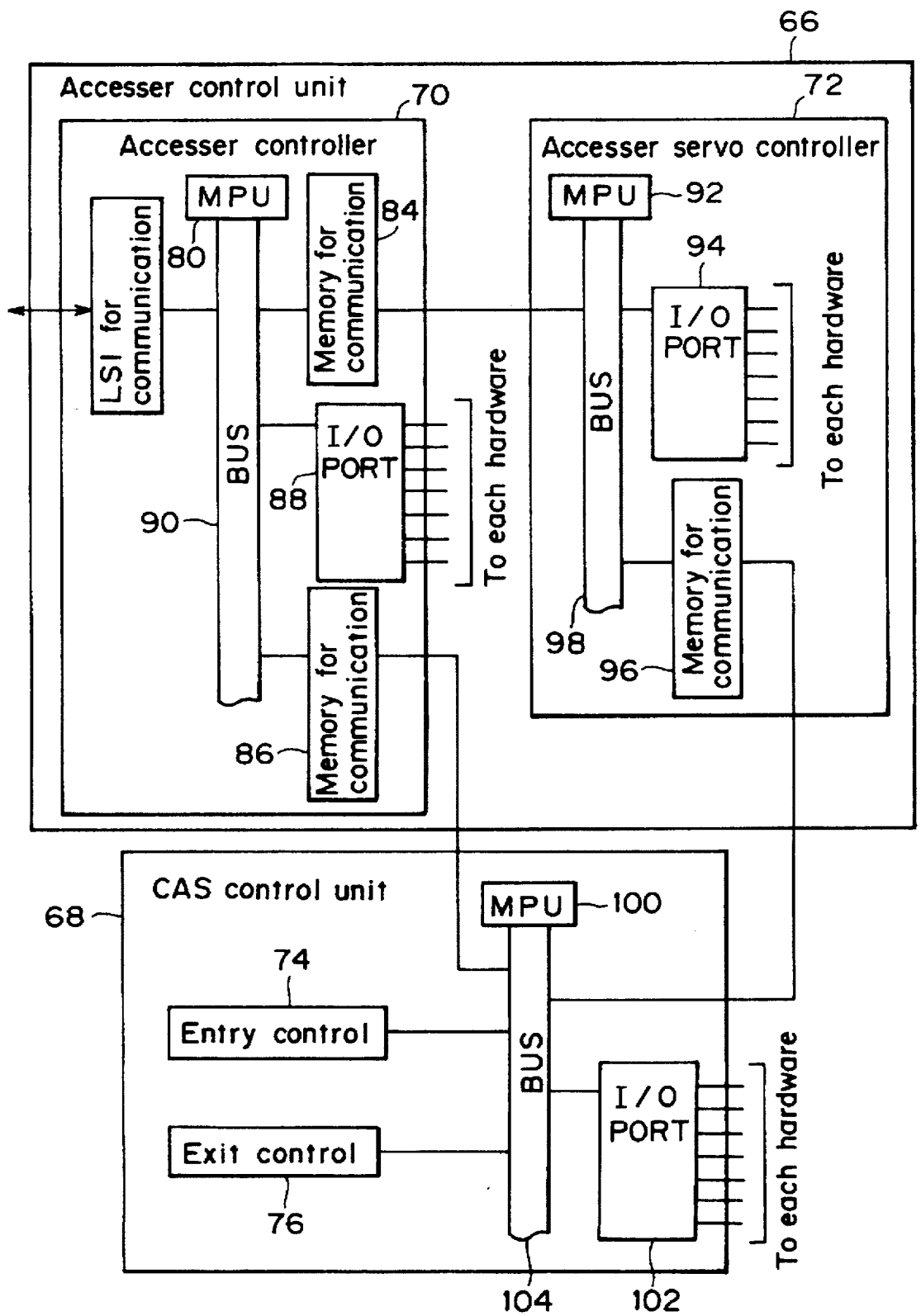
FIG. 9 is a block diagram of an accesser control unit and a CAS control unit.

FIG. 9 is a block diagram of the accesser control unit and the CAS control unit. The accesser control unit 66 includes the accesser controller 70, and the accesser servo controller 72. The accesser controller 70 includes a MPU 80, a communication LSI 82, a communication memories 84 and 86, and an I/O ports 88, those component elements being connected to one another through a data bus 90. The accesser servo controller 72 includes a MPU 92, an I/O port 94, and a communication memory 96, those component elements being connected to one another through a data bus 98.

The CAS control unit 68 includes a MPU 100, an entry control unit 74, an exit control unit 76, and an I/O port 102, those component elements being connected to one another through a data bus 104. The accesser controller 70 is connected to the accesser servo controller 72 and the CAS control unit 68 through the communication memories 84 and 86 contained therein, respectively. The accesser servo controller 72 is connected to the CAS control unit 68 through the communication memory 96 contained therein. An actual operation mode of such hardware will be described in detail with reference to a flow chart.

Figure 10A:
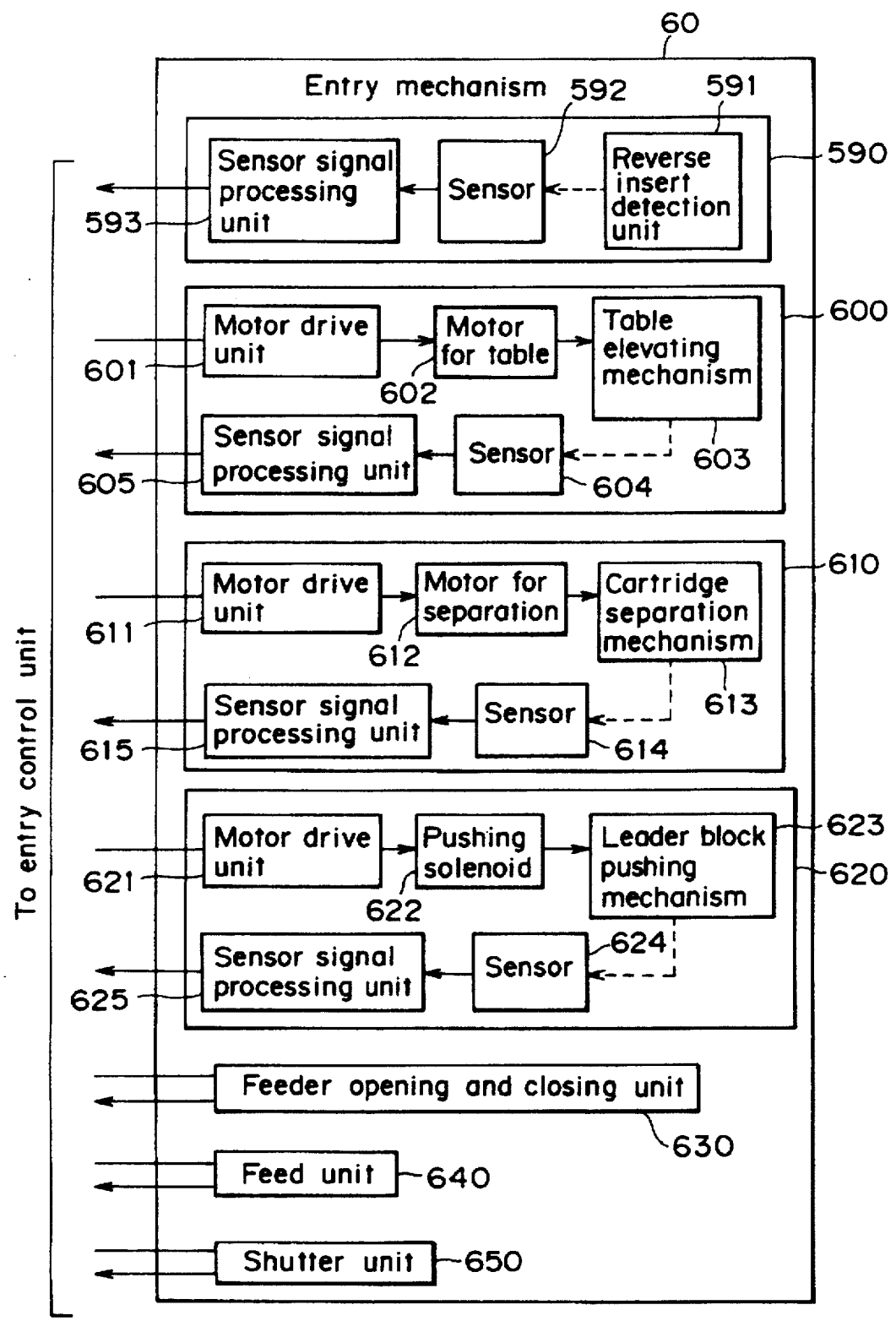
FIGS. 10A and 10B are block diagrams of an entry mechanism.
Figure 10B:
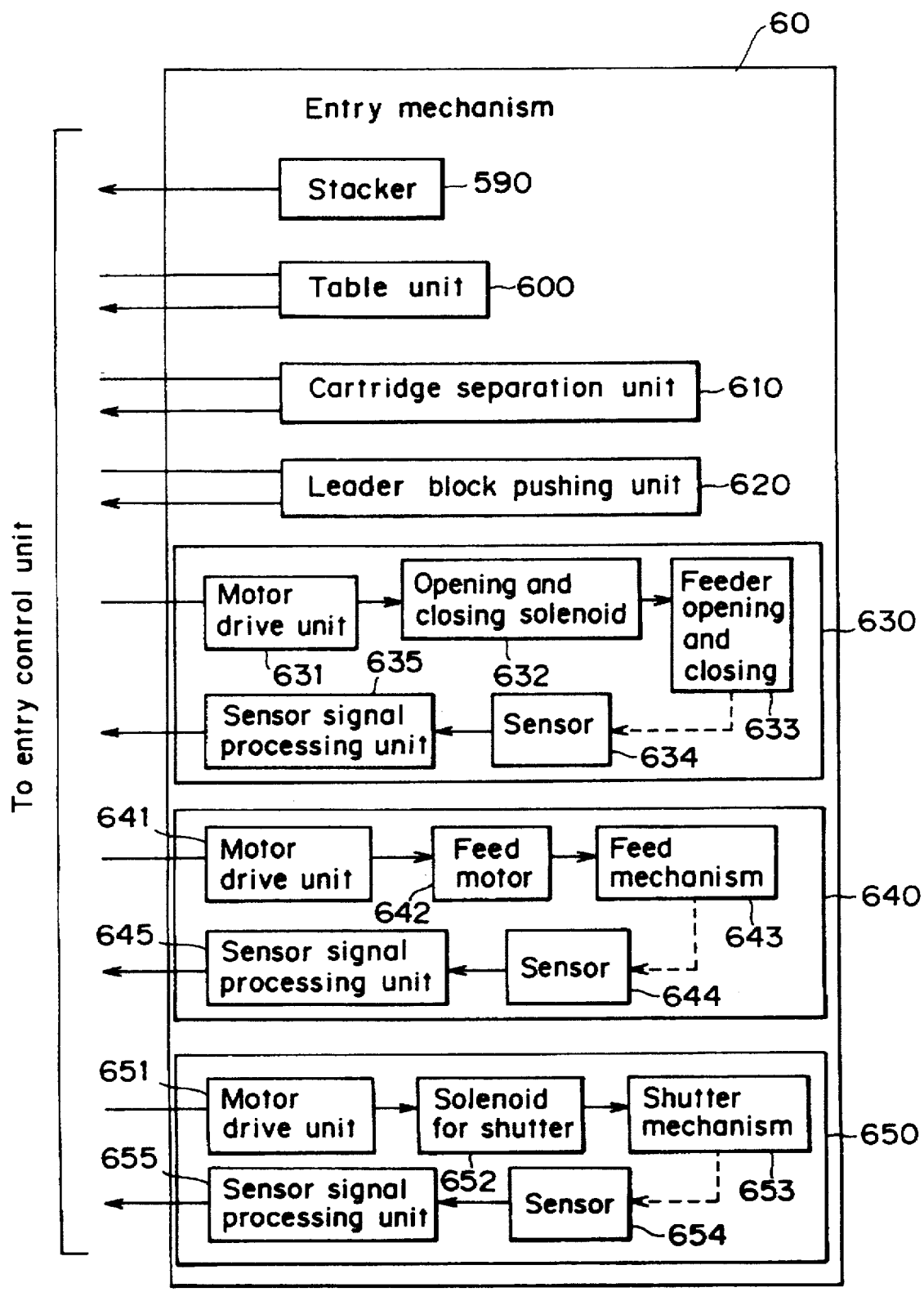

FIGS. 10A and 10B are block diagrams of the entry mechanism. The entry mechanism 60 includes a stacker 590, a table unit 600, a cartridge separation unit 610, a leader block pushing unit 620, a feeder opening/closing unit 630, a feed unit 640, and a shutter unit 650. The stacker 590 includes a reverse insert detection mechanism 591, a sensor 592, and a sensor signal processing unit 593. The table unit 600 includes a motor drive unit 601, a table motor 602, a table elevation and lowering mechanism (hereinafter simply referred to a table elevation mechanism) 603, a sensor 604, and a sensor signal processing unit 605.

The cartridge separation unit 610 includes a motor drive unit 611, a separation motor 612, a cartridge separation mechanism 613, a sensor 614, and a sensor signal processing unit 615. The leader block pushing unit 620 includes a motor drive unit 621, a pushing solenoid 622, a leader block pushing mechanism 623, a sensor 624, and a sensor signal processing unit 625.

The feeder opening/closing unit 630 includes a motor drive unit 631, a solenoid 632, a feeder opening and closing mechanism 633, a sensor 634, and a sensor signal processing unit 635. The feed unit 640 includes a motor drive unit 641, a feed motor 642, a feed mechanism 643, a sensor 644, and a sensor signal processing unit 645. The shutter unit 650 includes a motor drive unit 651, a shutter solenoid 652, a shutter mechanism 653, a sensor 654, and a sensor signal processing unit 655.

Figure 11:
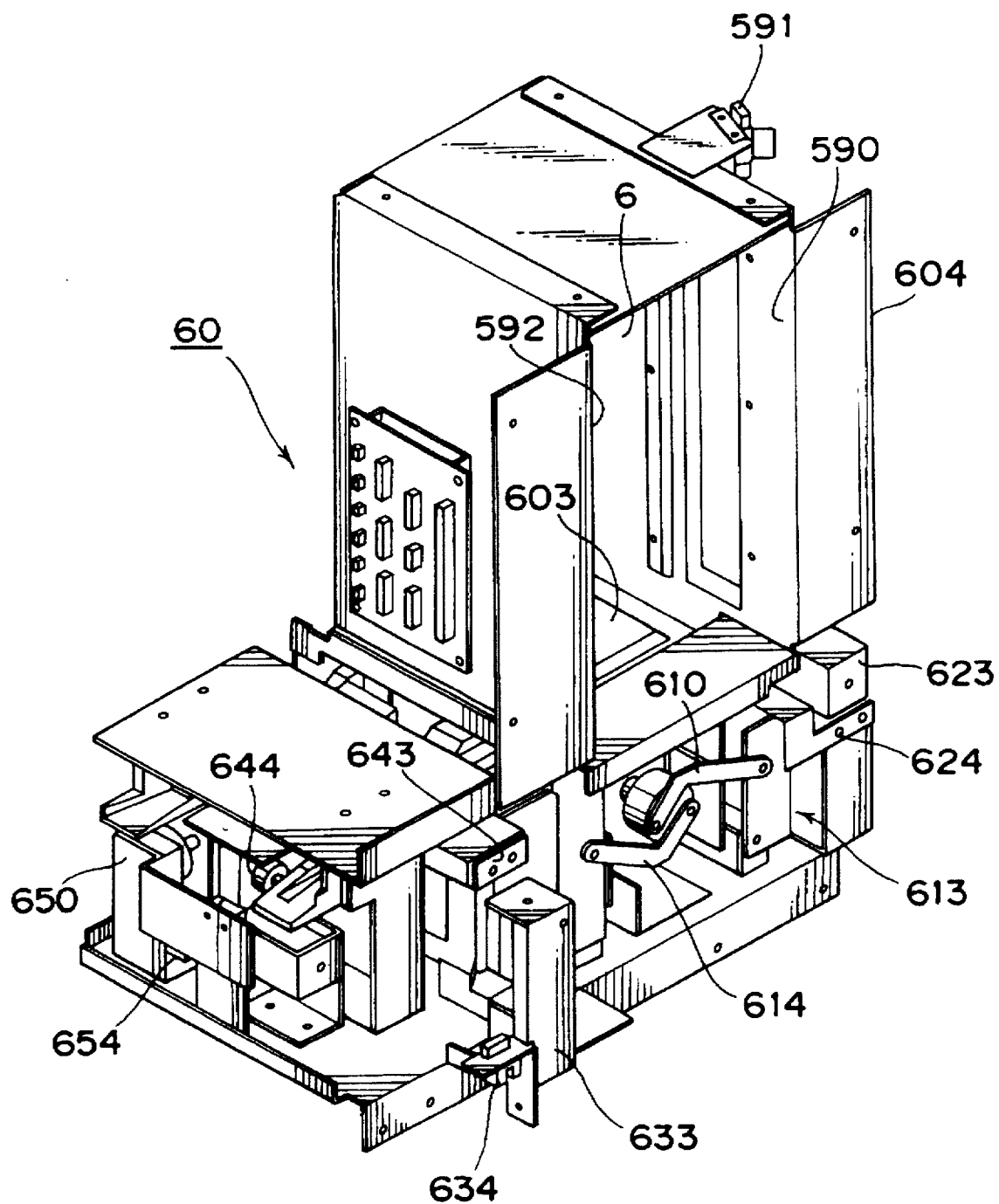
FIG. 11 is a perspective view of the entry mechanism of FIG. 10.
Figure 12:
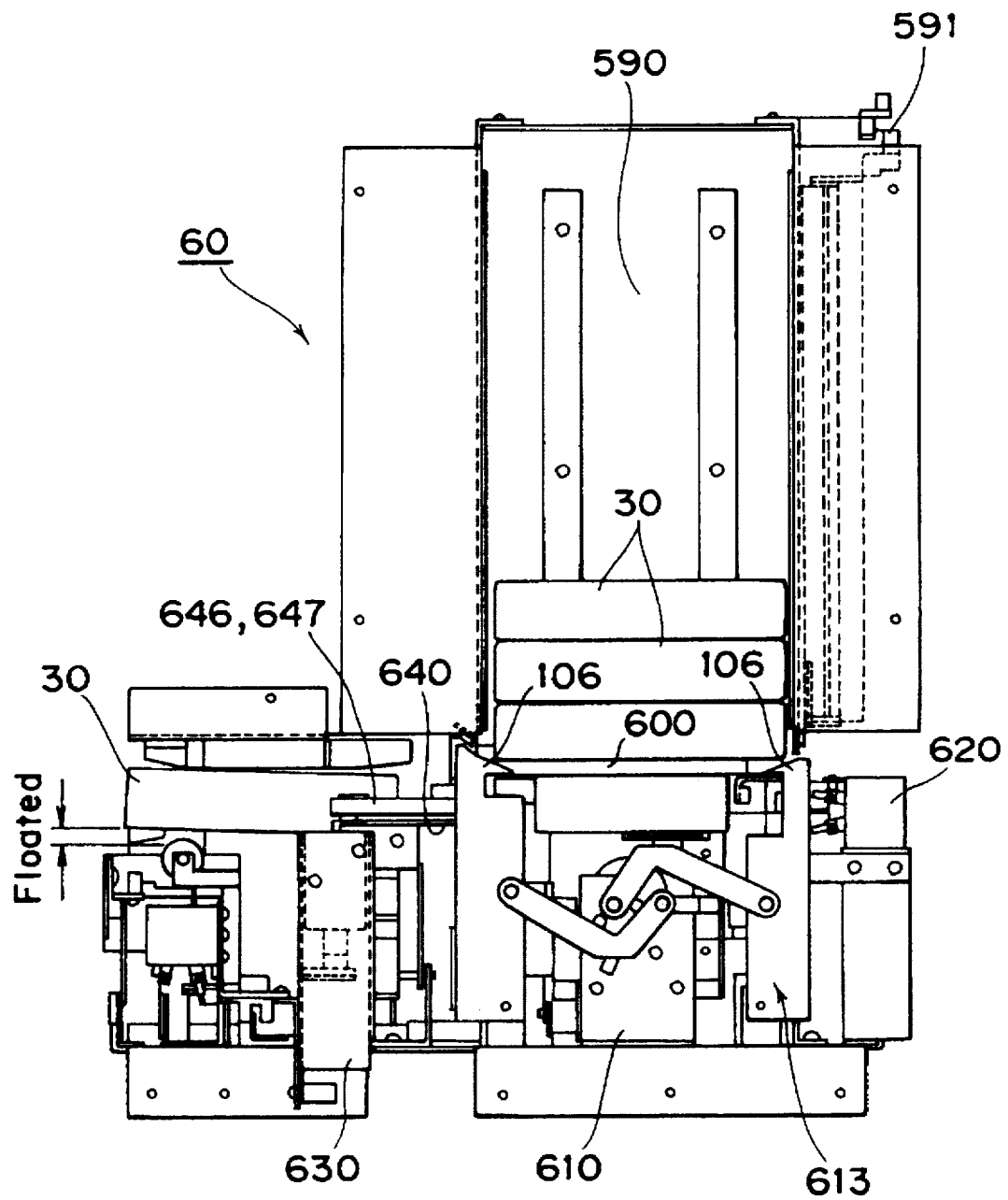
FIG. 12 is a front view of the entry mechanism of FIG. 10.
Figure 13:
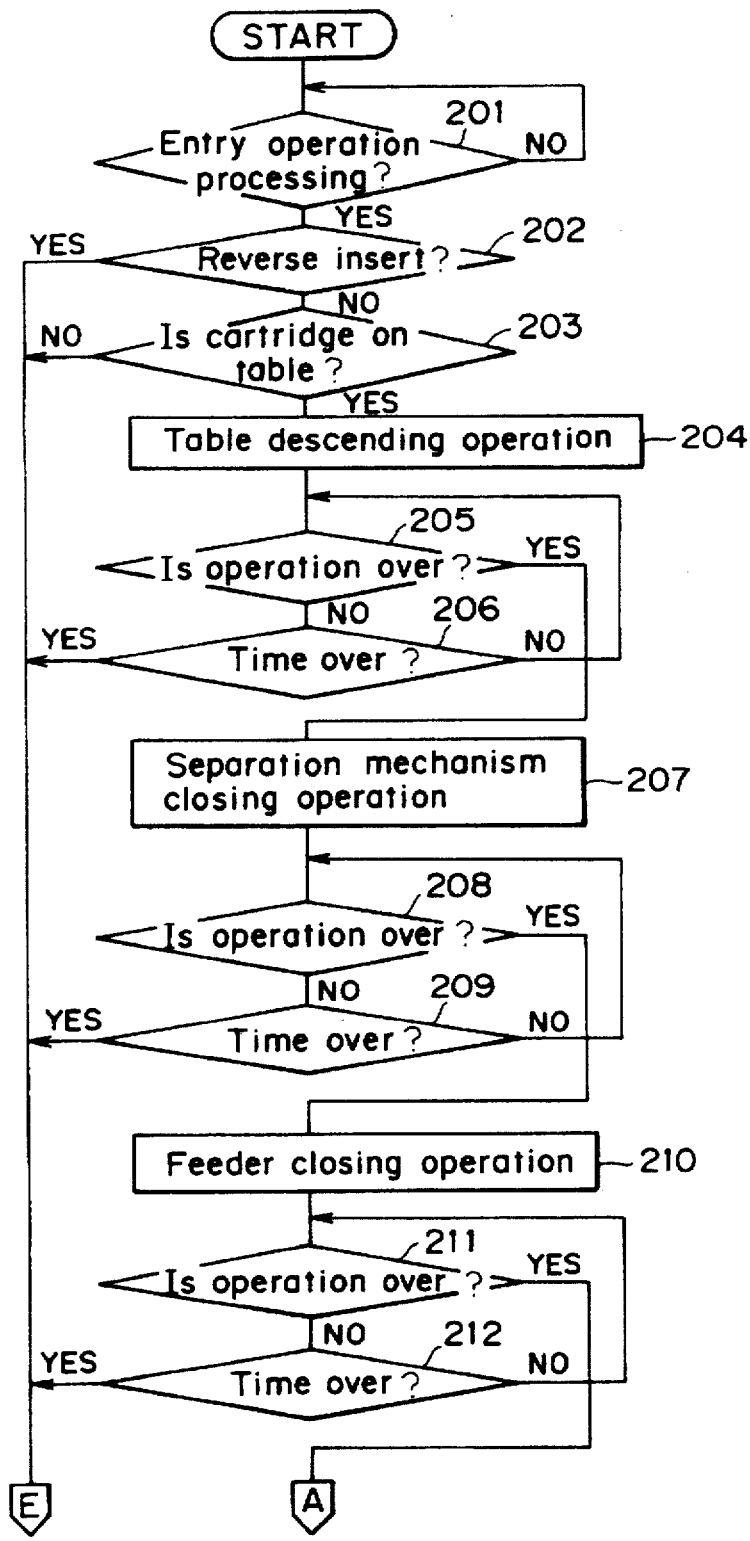
FIGS. 13 to 17 are flow charts of a cartridge entry operation.
Figure 14:
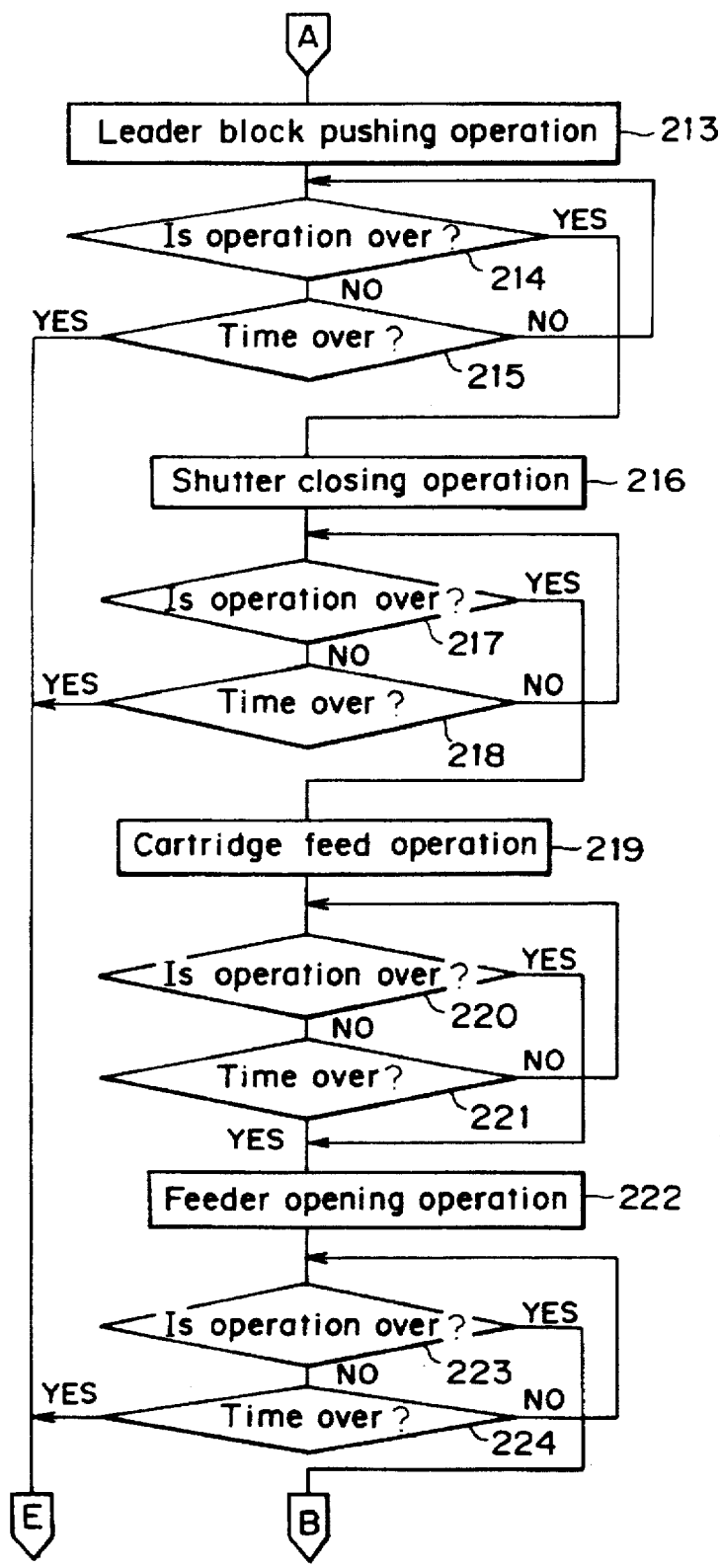
Figure 15:
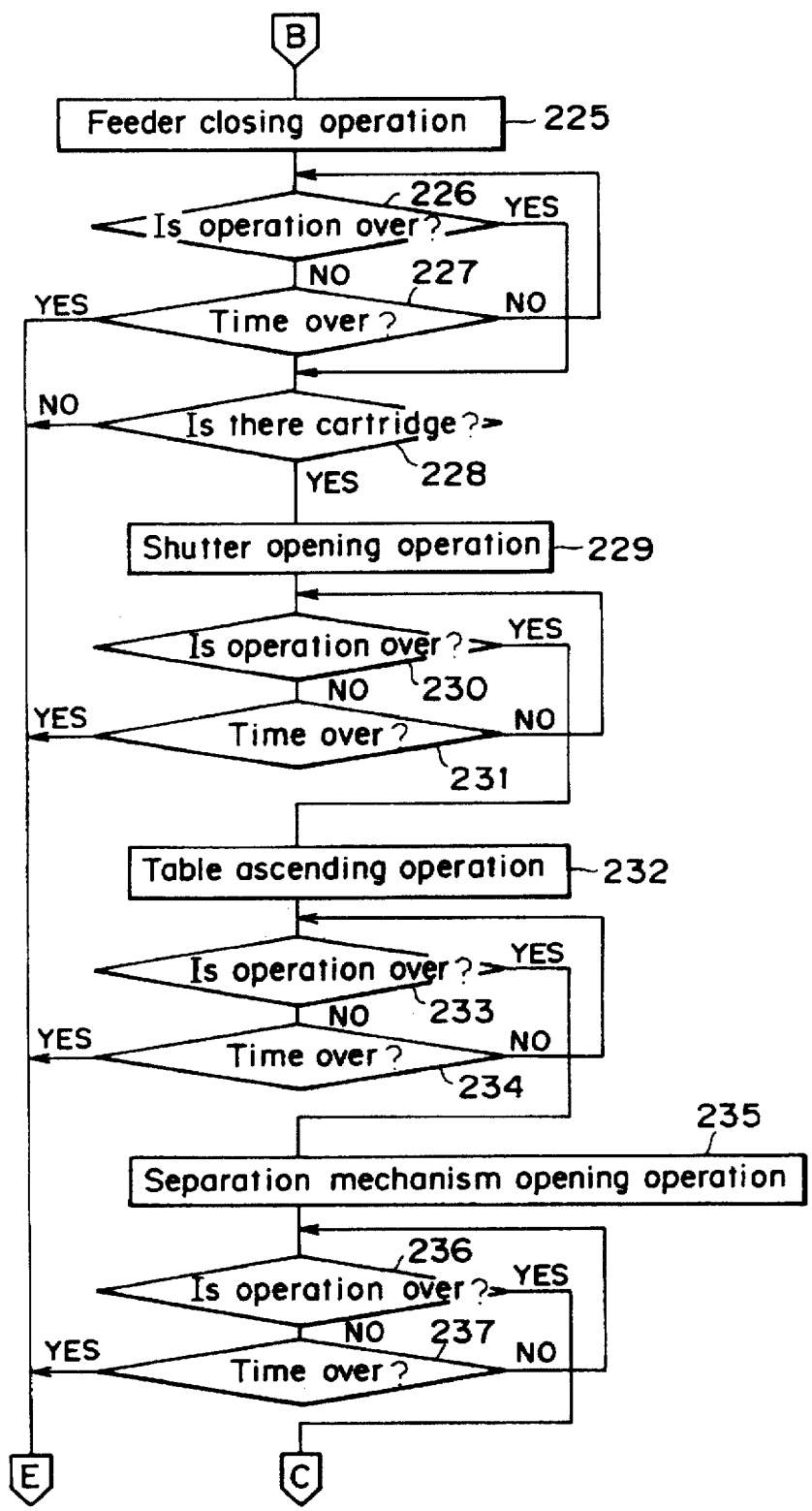
Figure 16:
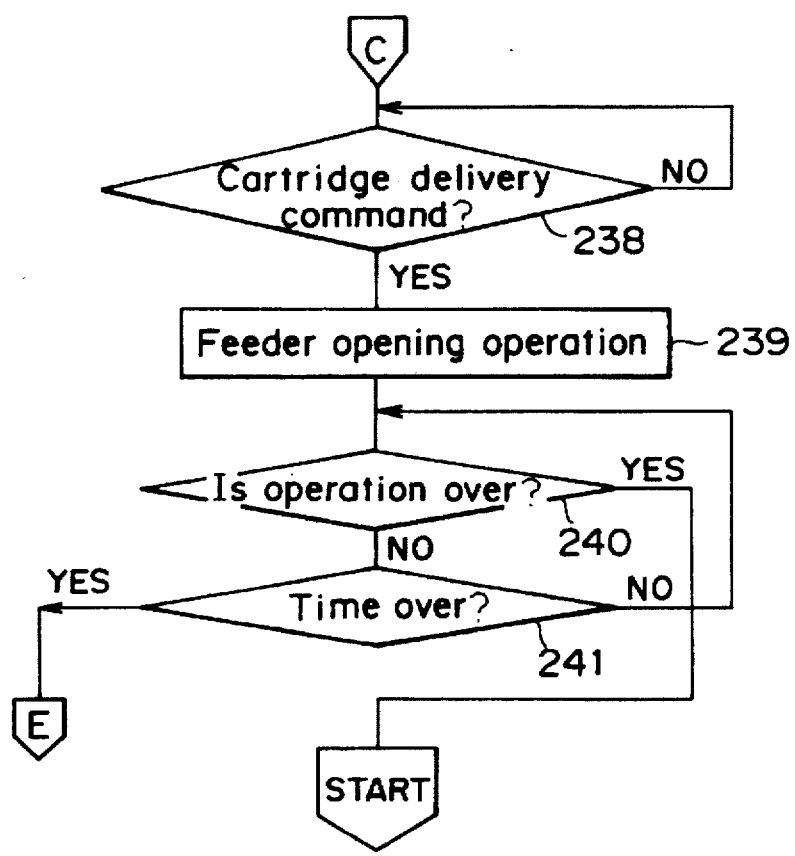
Figure 17:
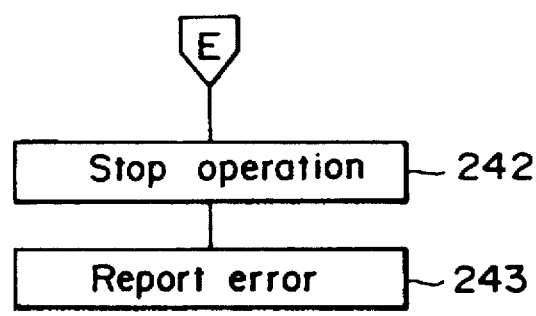

FIGS. 11 and 12 are a perspective view and a front view of the entry mechanism, respectively. The functions of the various component elements of the entry mechanism will be described with reference to FIGS. 10 to 12. The reverse insert detection mechanism 591 is adapted to detect whether or not the cartridge 30 set in the inlet port 6 is set in a reverse direction. If the result of detection is a reverse insert, the CAS control unit 68 makes an error report to the accesser control unit 66. The sensor 592 of the stacker 590 detects whether or not the cartridge 30 is placed on the table elevation mechanism 603.

The table elevation mechanism 603 has a table capable of performing ascending and descending operation. When a supply command is made through the operating panel 9, the cartridge 30 is moved to the accesser receiving position after the table is descended. The table is ascended when the sequential operations are over. The sensor unit 604 of the table unit 600 is adapted to control the operation of the table. The sensor unit 604 has two sensors, one at an uppermost position of the table operation and the other at a lowermost position of the table operation.

The leader block pushing mechanism 623 is a mechanism for correctively pushing the leader block 56 into the cartridge case 51 because there is a possibility that the leader block 56 (see FIG. 7) of the cartridge 30 descended by the table elevation mechanism 603 is disengaged from the cartridge case 51. The sensor 624 of the leader block pushing unit 620 is adapted to detect whether or not the leader block pushing mechanism 623 has normally operated.

The cartridge separation unit 610 is adapted to separate a lowermost cartridge 30 among the cartridges 30 set in the cartridge inlet port 6. When the table is located at the lower position, claws 106 are closed (see FIG. 12), and when the table has completed the ascending movement after the completion of the sequential operations, the claws 106 are opened. The sensor 614 of the cartridge separation unit 614 is adapted to detect the opening or closing condition of the claws 106.

The feed unit 640 is adapted to transfer the cartridge 30 on the table elevation mechanism 603 (first position) to a delivery position (second position) to the accesser 20. The feed unit 640 has two feeders 646 and 647 (see FIG. 12) which contact opposite side surfaces of the cartridge 30 so as to transfer the cartridge 30. The feeders 646 and 647 each comprise, for example, a plurality of pulleys arranged in a row and an endless belt trained over the pulleys. The sensor 644 of the feed unit 640 is adapted to detect the cartridge 30 transferred by the feed mechanism 643. By this, the feed operation of the cartridge 30 is controlled.

The feeder opening/closing unit 630 is adapted to close the feeders 646 and 647 to sandwich the cartridge 30 therebetween before the cartridge 30 is transferred and open the feeders 646 and 647 when the cartridge 30 is delivered to the accesser 20. The sensor 634 of the feeder opening/closing unit 630 is adapted to detect the opening or closing condition of the feeders 646 and 647. By this, the opening/closing operation of the feeders is controlled.

The shutter unit 650 is adapted to stop the cartridge 30, which has been transferred by the feed unit 640, at the delivery position to the accesser 20. When the cartridge 30 is being fed by the feed unit 640, the shutter is closed, and when the feed is over, the shutter is opened. The sensor 654 of the shutter unit 650 is adapted to detect the opening or closing condition of the shutter at the shutter unit 650. By this, the opening/closing operation of the shutter is controlled. The opening/closing operation of the feeders 646 and 647, which is one of the features of the present invention, will be described later. A more detailed discussion of the entry mechanism is described in U.S. Pat. No. 5,432,656 filed on Apr. 28, 1993 and contents thereof are incorporated herein by reference.

Next, a sequence of operations will be described for transferring the cartridge 30 from the cartridge inlet port 6 to the delivery position to the accesser 20. When the CAS control unit 68 has received a switch information of the operating panel 9 from the accesser control unit 66, it recognizes based on the information from the stacker 590 that the cartridge 30 is not reversely inserted and the cartridge 30 is set on the table elevation mechanism 603. Thereafter, the CAS control unit 68 recognizes that the table elevation mechanism 603 is in the upper position and actuates the table elevation mechanism 603 downwardly for a predetermined time period. Here, the term "predetermined time period" refers to the time required for the table to reach the lower position. If the result of detection is a reverse insertion, the CAS control unit 68 makes an error report to the accesser control unit 66. In accordance with this report, the accesser control unit 66 indicates, on the operating panel 9, of the fact that the cartridge 30 is reversely inserted, thereby alerting the operator of this fact.

While the descending operation of the table elevation mechanism 603 is undergoing, it is being detected by the sensor unit 604 of the table unit 600 that the table elevation mechanism 603 reaches the lower position. Here, if the table elevation mechanism 603 reaches the lower position in a predetermined time period, the activation of the table elevation mechanism 603 is stopped, but if the table elevation mechanism 603 does not reach the lower position in the predetermined time, the CAS control unit 68 makes an error report to the accesser control unit 66 indicating "time out". When the descending operation of the table is over, the claws 106 (see FIG. 12) are driven in the closing direction in the cartridge separation unit 610. Also in this case, the operating position of the cartridge separation mechanism 613 is being detected by the sensor unit 614. By actuating the cartridge separation mechanism 613 for a predetermined time period, only the lowermost cartridge 30 among the plurality of cartridges 30 located on the table is separated from the cartridges on the table.

Then, the feeder opening and closing mechanism 633 is activated in the closing direction (sandwiching direction of the cartridge 30 by the feeders 646 and 647) by the feeder opening and closing unit 630. Thereafter, the leader block 56 of the cartridge 30 is pushed by the leader block pushing unit 620, the shutter is closed by the shutter unit 650, and the cartridge 30 is transferred to the delivery position to the accesser 20 by the feed unit 640.

Before the cartridge 30 hits the shutter, the cartridge 30 is detected (if the cartridge is not detected in a predetermined time period, an error report is sent to the accesser control unit 66) by the sensor 644 of the feed unit 64. By overrunning the detected cartridge 30, the cartridge 30 is brought into abutment with the shutter. Thereafter, the shutter in its closed position is opened by the shutter unit 650, the table elevation mechanism 603 is ascended, and the cartridge separation unit 610 is operated to open the claws 106. If the operations are normal to this point, the CAS control unit 68 reports to the accesser control unit 66 to the effect that the operations have been normally completed.

When the entry mechanism of the above-mentioned type is actually used, the following problems sometimes arise.

(1) The cartridge 30 is sometimes floated as shown in FIG. 12 due to irregularities of dimensional accuracy of the feeder mechanism 633 when the cartridge 30 is being transferred from the delivery position to the accesser. As a result, it sometimes happens that the sensor 644 of the feed unit 640 cannot detect the cartridge 30 in spite of the fact that the cartridge 30 is in abutment with the shutter, thus resulting in the error report.

(2) Even if it is judged that the feed is over based on the detection of the cartridge 30 by the sensor 644 of the feed unit 640 and the cartridge 30 is delivered to the accesser 20, it sometimes happens that the cartridge 30 is gripped by the accesser 20 in its floating condition. Since the cartridge 30 is held in an unstable state, there is a fear that the cartridge 30 may be dropped and broken when the accesser 20 is moved to the drive units 28, etc.

(3) Even if the cartridge 30 is not dropped from the accesser 20, there is a possibility that the cartridge 30 may not be received in the cell in a normal state when the cartridge 30 is stored in the cell of the cell drum 12, thus resulting in the error report.

According to the operation of the entry mechanism of the present invention, the cartridge 30 is prevented from being floated when the cartridge 30 is transferred. Specifically, immediately after the cartridge 30 is brought into abutment with the shutter, the feed mechanism 634 is opened by the feeder opening/closing unit 630. As a consequence, since no frictional force is generated between the feeders 646, 647 and the cartridge 30, the cartridge 30 is dropped to a normal position, thereby obviating the floating of the cartridge 30.

When the sensor 634 of the feeder opening and closing unit 630 detects that the feed mechanism 643 is opened, the feed mechanism 643 is closed immediately. The time period for the feed mechanism 643 to be opened may be very short (for example, two seconds). Thereafter, the shutter is opened, the table is ascended, and the claws 106 of the cartridge separation unit 610 are opened. If the operations to this point are normal, the CAS control unit 68 reports the accesser control unit 66 to the effect that the operations are normally completed.

The feed mechanism 643 is kept in the closed position relative to the cartridge 30 in the receiving position for the accesser 20, the accesser control unit 66 moves the accesser 20 to the receiving position of the cartridge 30, and the accessor 20 grips the cartridge 30. Then, a command for opening the feeder opening and closing mechanism 633 is sent from the accesser control unit 66 to the CAS control unit 68. By this, the cartridge gripped by the accesser 20 can be drawn into the accesser 20.

In a control for transferring the cartridge 30 to the receiving position for the accessor 20 by the feed mechanism 643, in order to actuate the feed mechanism 643 for a predetermined time period (time period enough for the cartridge 30 to reach the receiving position for the accesser 20), time is counted as soon as the feed mechanism 643 is actuated and the completion of the feed of the cartridges 30 is delayed while monitoring the sensor 644 of the feed unit 640. At this time, if the cartridge 30 is floated so that the cartridge 30 cannot be detected by the sensor 644, the above-mentioned predetermined time period is lapsed. Here, first, actuation of the feed mechanism 643 is stopped. Then, presuming that the cartridge 30 is floated before an error judgment is made, the feeder opening and closing mechanism 633 is driven in the opening direction so that the cartridge 30 is temporarily released.

Then, the sensor 644 of the feed unit 640 is again caused to detect the presence or non-presence of the cartridge 30. If it is detected here that the cartridge 30 is present, the feeder opening and closing mechanism 633 is driven in the closing direction judging that the feed operation of the cartridge 30 is normally finished, and the program proceeds to the next sequence. In contrast, if the presence of the cartridge 30 is not detected by the sensor 644, an error report is sent to the accesser control unit 66 judging that an error has occurred. As described in the foregoing, even if the cartridge 30 cannot be detected by the sensor 644 of the feed unit 640, an erroneous operation caused by floating of the cartridge 30 can be prevented by the opening and closing operation of the feeder opening and closing mechanism 633. As a result, a system down due to erroneous operation can be prevented.

More specific controlling procedure will be described with reference to flow charts of FIGS. 13 to 17. Upon receipt of an entry operation start information in Step 201, it is judged in Step 202 whether or not the cartridge is set reversely. If the cartridge is not reversely set, the program proceeds to Step 203 where it is detected whether or not the cartridge is present on the table. If it is detected that the cartridge is set reversely in Step 202, or if it is detected that the cartridge is not present on the table in Step 203, the program proceeds to Step 242 of FIG. 17 where the entry operation is stopped. Then, an error report is sent in Step 243.

When it is detected in Step 203 that the cartridge is present on the table, the program proceeds to Step 204 where a descending operation of the table is started. Subsequently, in Step 205, it is judged whether or not the descending operation of the table is completed. If not completed, the program proceeds to Step 206 where it is judged whether or not a predetermined time period (for example, five seconds) has passed since the start of the descending operation of the table. If the judgment result in Step 206 is negative, the program returns to Step 205.

If it is judged in Step 205 that the descending operation of the table is completed, the program proceeds to Step 207. If it is judged in Step 206 that the predetermined time period has passed since the start of the descending operation of the table and thus "time over", the program proceeds to Step 242 of FIG. 17 where the entry operation is stopped. Then in Step 243, an error report is sent. Subsequently, in Steps 207 to 209, the cartridge separation mechanism is operated and if the claws are closed in a predetermined time period (for example, two seconds), the program proceeds to Step 210. If the claws are not closed in the predetermined time period, the program proceeds to Step 242 of FIG. 17.

In Steps 210 to 212, a feeder closing operation is performed, and if the feeder is closed in a predetermined time period (for example, two seconds), the program proceeds to Step 213. If the feeder is not closed in the predetermined time period, the program proceeds to Step 242 of FIG. 17. In Steps 213 to 215, the leader block pushing operation is performed by actuating the solenoid, and if the operation is completed in a predetermined time period (for example, five seconds), the program proceeds to Step 216. If the operation is not completed, the program proceeds to Step 242. The table descending operation in Step 204 and the operation of the cartridge separation mechanism in Step 207 are performed by exclusive-use motors, respectively. The feeder closing operation in Step 210 is performed by an exclusive-use solenoid.

In Steps 216 to 218, the shutter closing operation is performed. If the operation is completed in a predetermined time period (for example, two seconds), the program proceeds to Step 219, and if not, the program proceeds to Step 242. In Steps 219 to 221, the cartridge feed operation is performed only for a predetermined time period (for example, five seconds). If the operation is completed in the predetermined time period, the program proceeds to Step 222. Even if the operation is not completed in the predetermined time period, the program also proceeds to Step 222 without recognizing "time out".

In Steps 222 to 224, the solenoid is actuated so that the feeder is opened. If the opening operation is completed in a predetermined time period, the program proceeds to Step 225 and if not, the program proceeds to Step 242. In Steps 225 to 227, the solenoid is actuated so that the feeder is closed. If it is detected that the feeder is closed in a predetermined time period (for example, two seconds), the program proceeds to Step 228, and if not, the program proceeds to Step 242.

In Step 228, it is judged whether or not the cartridge is in the receiving position for the accesser. If the judgment result in Step 228 is affirmative, the program proceeds to Step 229, and if negative, the program proceeds to Step 242. In Steps 229 to 231, the operation for opening the shutter is performed by actuating the solenoid. If the opening of the shutter is completed in a predetermined time period (for example, two seconds), the program proceeds to Step 232, and if not, the program proceeds to Step 242. In Steps 232 to 234, the table ascending operation is performed by actuating the motor. If the table ascending operation is completed in a predetermined time period (for example, five seconds), the program proceeds to Step 235, and if not, the program proceeds to Step 242.

In Steps 235 to 237, the opening operation of the cartridge separation mechanism is performed by actuating the motor. If the opening operation of the cartridge separation mechanism is not completed in a predetermined time period (for example, five minutes), the program proceeds to Step 238, and if not, the program proceeds to Step 242. In Step 238, a report about the normal completion of the moving operation of the cartridge to the delivery position to the accesser is sent to the accesser control unit and a command from the accesser control unit is delayed. Here, if a command requesting the delivery of the cartridge is received from the accesser control unit, the program proceeds to Step 239.

In Steps 239 to 241, the feeder opening operation is performed by actuating the solenoid so that the cartridge is delivered to the accesser. If the feeder opening operation is completed in a predetermined time period (for example, two seconds), the above-stated sequence of operations are finished, and the program returns to the first Step (Step 201) of this flow chart. If the feeder opening operation is not completed in the predetermined time period, the program proceeds to Step 242 where the entry operation is stopped. Thereafter, an error report is sent in Step 243.

As described in the foregoing, according to the present invention, there can be provided a library apparatus in which adverse effects caused by floating of a cartridge while the cartridge is being transferred by the entry mechanism of the cartridge access station are eliminated.

What is claimed is:

1. A library apparatus comprising:

a cell unit having a plurality of cells each for receiving a recording medium cartridge;

a drive unit for recording/reproducing information on the recording medium cartridge;

a cartridge access station for supplying/discharging the recording medium cartridge, said cartridge access station including an entry mechanism for separating, one by one, a plurality of recording medium cartridges supplied to a first position and transferring each of such separated cartridges to a second position; and an accesser for moving the recording medium cartridge from one to the other among said cell unit, said drive unit and said cartridge access station;

said entry mechanism comprising:

first and second endless belt feeders capable of contacting opposite side surfaces of the recording medium cartridge so as to transfer the recording medium cartridge, said first and second endless belt feeders sandwiching the recording medium cartridge therebetween for transfer;

feeder opening/closing means for opening/closing said first and second endless belt feeders so that said recording medium cartridge is sandwiched between said first and second endless belt feeders;

control means for controlling said feeder opening/closing means such that said first and second endless belt feeders are closed when the recording medium cartridge is supplied to said first position and said first and second endless belt feeders are opened when the recording medium cartridge is transferred to said second position so as to be readily received by said accesser, said control means being adapted to open, for a short time period, said first and second endless belt feeders and to close said first and second endless belt feeders again before the recording medium cartridge is transferred to said second position so as to be ready for said accesser to receive the cartridge;

said entry mechanism including a shutter disposed at a location where the recording medium cartridge is delivered to said accesser by said mechanism and means for opening and closing said shutter, said shutter preventing the recording medium cartridge from being delivered to said accesser when said shutter is closed and allowing delivery when said shutter is open;

said first and second endless belt feeders being configured for bringing the cartridge in contact with said shutter in a closed position;

said control means being configured for initiating said opening and closing of said feeders upon said contact with said shutter and for immediately closing said feeders upon said opening thereof; and said shutter being configured to be opened and allowing the recording medium cartridge to be delivered to said accesser upon completion of said opening and closing of said first and second endless belt feeders, wherein the recording medium cartridge is placed in contact with said shutter by said first and second endless belt feeders before the recording medium cartridge is transferred to said accesser.

2. A library apparatus according to claim 1, wherein said entry mechanism further comprises a feed completion detection means for detecting a completion of movement of the recording medium cartridge to said second position; and wherein said control means controls said feeder opening/closing means such that when the completion of movement of the recording medium cartridge to said second position is not detected by said feed completion detection means after the passage of a predetermined time from the start of the transferring operation of the recording medium cartridge, said first and second feeders are opened for a short time period and then closed again.

3. A library apparatus according to claim 1, wherein said recording medium cartridge is a magnetic tape cartridge having a generally rectangular parallelepiped cartridge case, a magnetic tape received in said cartridge case in a rolled-up condition, and a leader block mounted on one end of said magnetic tape.

4. A library apparatus comprising:

a cell unit having a plurality of cells each for receiving a recording medium cartridge;

a drive unit for recording/reproducing information on the recording medium cartridge;

a cartridge access station for supplying/discharging the recording medium cartridge, said cartridge access station including an entry mechanism for separating, one by one, a plurality of recording medium cartridges supplied to a first position and transferring each of such separated cartridges to a second position; and an accesser for moving the recording medium cartridge from one to the other among said cell unit, said drive unit and said cartridge access station;

said entry mechanism comprising:

first and second endless belt feeders capable of contacting opposite side surfaces of the recording medium cartridge so as to transfer the recording medium cartridge;

feeder opening/closing means for opening/closing said first and second endless belt feeders so that said recording medium cartridge is sandwiched between said first and second endless belt feeders;

control means for controlling said feeder opening/closing means such that said first and second endless belt feeders are closed when the recording medium cartridge is supplied to said first position and said first and second endless belt feeders are opened when the recording medium cartridge is transferred to said second position so as to be readily received by said accesser, said control means being adapted to open, for a short time period, said first and second endless belt feeders and to close said first and second endless belt feeders again before the recording medium cartridge is transferred to said second position so as to be ready for said accesser to receive the cartridge;

said entry mechanism including a shutter disposed at a location where the recording medium cartridge is delivered to said accesser by said mechanism and means for opening and closing said shutter, said shutter preventing the recording medium cartridge from being delivered to said accesser when said shutter is closed and allowing delivery when said shutter is open;

said first and second endless belt feeders being configured for bringing the cartridge in contact with said shutter in a closed position;

said control means being configured for initiating said opening and closing of said feeders upon said contact with said shutter and for immediately closing said feeders upon said opening thereof;

said shutter being configured to be opened and allowing the recording medium cartridge to be delivered to said accesser upon completion of said opening and closing of said first and second endless belt feeders, wherein the recording medium cartridge is placed in contact with said shutter by said first and second endless belt feeders before the recording medium cartridge is transferred to said accesser;

said entry mechanism further comprising a feed completion detection means for detecting a completion of movement of the recording medium cartridge to said second position; and wherein said control means controls said feeder opening/closing means such that said opening and closing of said feeders is initiated when a cartridge is not detected after the passage of a predetermined time from the start of the transferring operation of the recording medium cartridge.

* * * * *

UNITED STATES PATENT AND TRADEMARK OFFICE
CERTIFICATE OF CORRECTION

PATENT NO. : 5,715,113
DATED : February 3, 1998
INVENTOR(S) : Yoshiki Akiyama

It is certified that error appears in the above-identified patent and that said Letters Patent is hereby corrected as shown below:

On title page,

Under "[56] References Cited" and "U.S. Patent Documents" insert --5,402,283  3/1995 Yamakawa et al. 360/92--

Signed and Sealed this

Eighth Day of September, 1998

Attest:

BRUCE LEHMAN

*Attesting Officer*     *Commissioner of Patents and Trademarks*